United States Patent Office 3,840,509
Patented Oct. 8, 1974

3,840,509
PROCESS FOR PREPARING POLYMERS
FROM STYRENE
Hikokusu Kajimoto, Masahiro Tokuda, Isao Hayashi, and Kenichiro Kondo, Tokyo, Japan, assignors to Mitsubishi Jukogyo Kabushiki Kaisha, Tokyo, Japan
Filed Apr. 12, 1972, Ser. No. 243,195
Claims priority, application Japan, Apr. 24, 1971, 46/26,461
Int. Cl. C08f 1/04, 7/04, 1/02
U.S. Cl. 260—93.5 R
2 Claims

ABSTRACT OF THE DISCLOSURE

A process for preparing polymers from polymerizable organic compounds which comprises carrying out a polymerization reaction in a cylindrical casing equipped with a plurality of rotating shafts in parallel, each carrying thereon a plurality of agitation discs in a row, said shafts being rotated at the same speed in the direction opposite to each other, characterized in that the polymerization reaction is effected under temperature conditions controlled by scattering controlled amounts of a nonsolvent having a boiling point lower than those of the polymerization solution, monomer and solvent and which evaporates at temperature of the polymerization solution retained in the cylindrical casing, over the free surface of the retained polymerization solution in a plurality of axially divided sections of the casing, allowing the nonsolvent to evaporate, and then taking out the evaporated nonsolvent from the cylindrical casing.

---

This invention relates to a process for preparing polymers from polymerizable organic compounds, such as monovinyl aromatic compounds typically represented by styrene.

The process of the invention is advantageously applicable to the manufacture of polymers under such conditions which involve a remarkable increase in the viscosity of the system with the progress of the polymerization reaction, for example in the case where a polymer is obtained by bulk polymerization of a monomer or monomeric mixture in the presence or absence of a polymerization catalyst or where a polymer is prepared by solution polymerization in the presence of an inert solvent.

Preparation of purified polymers through continuous bulk or solution polymerization of monomers, such as styrene, has presented various knotty problems. Most of them are attributable to the fact that the progress of the polymerization reaction is accompanied by a considerable increase in the viscosity of the reaction mixture (i.e., the mixture of a monomer and a polymer with or without a solvent, such a mixture being hereinafter called a "polymerization solution"). Among those problems is the control of temperature for the polymerization reaction of such a polymerization solution. As the reaction proceeds, the polymerization solution attains increased viscosity with the rise of the polymer concentration therein and the heat transfer rate of the solution decreases. As a result, the dissipation of the heat of reaction and agitation is decreased because of the indirect heat-exchanging means employed, and eventually it becomes impossible to adjust the polymerization temperature as desired. Although the heat removal capacity of the indirect heat-exchanging means can be increased by raising the agitation rate, a high rate of agitation will intensify the heat of agitation and make the control of the polymerization temperature totally impossible.

As an approach to the difficult problem of polymerization temperature control through an improvement of the indirect heat exchange, it has been proposed to scrape off the polymerization solution from the vicinity of the heating surface and allow it to be replaced by a fresh portion of the solution. The technique has proved successful with small-scale apparatus so far as the increase of heat transfer rate is concerned. However, it has a drawback in that the scale of polymerization is limited for the following reason. Because the heating surface is restricted, for example, to the inner wall surface of the polymerization reactor, the ratio of the amount of polymerization solution to be treated to the overall area of the heating surface is increased with the expansion of the equipment, and the large equipment increases the amount of the polymerization solution that can be handled, and this leads to a proportional increase in the total quantity of heat generated, for example by the reaction and agitation. Another proposal combines the aforedescribed technique with a concept of direct cooling by evaporation. The proposed method consists in evaporating a monomer or monomeric mixture, or a monomer-solvent mixture from the polymerization solution in the reaction zone and removing the vaporized stream, thereby allowing the heat of vaporization to effect cooling of the solution. The method has a shortcoming, too. The presence of a polymer generally raises the boiling point of the polymerization solution itself and renders it difficult to maintain the polymerization temperature at a desired value, thus producing a very unfavorable effect upon the quality of the resulting polymer. This shortcoming of the direct cooling method can be remedied by operation under reduced pressure. However, the remedy has its own side effect. In the operation under reduced pressure, evaporative bubbling occurs not only along the free surface of the reaction zone but throughout the reaction solution. The phenomenon reduces the volume efficiency of the reactor and makes continuous operation impossible because of adhesion of the polymerization solution to the inner wall surface of the reactor.

Another problem which arises from the increased viscosity of a polymerization solution is nonuniformity of mixing, e.g., in the temperature and concentration of the polymerization solution and in the distribution of retention time. The portion of the polymerization solution close to the heating surface must be quickly and uniformly mixed with the main body of the solution; otherwise, high viscosity combines with poor thermal conductivity to cause nonuniformity of the temperature distribution. Since the quailty of a polymerization product is highly dependent upon the temperature conditions, the nonuniformity of the temperature distribution produces a polymer with seriously nonuniform quality. It should also be noted that in continuous operation, the retention time distribution of the polymerization solution in the reactor plays a role as essential as the above-mentioned reaction temperature conditions for the production of the polymer. An operation which involves a high degree of so-called back mixing whereby the distribution of the retention time of the polymerization solution is made irregular, of course, reduces the volume efficiency of the reactor, and also seriously lowers the degree of completion of the reaction. Moreover, the so-called dead space of the polymer solution which is formed as an indication of an abnormally extended retention time will expand rapidly with the increase in the viscosity of the polymerization solution being treated, unless some special consideration is given to this aspect. The existence of the unusually-long-retention-time portion of the solution being treated can promote coloring, thermal decomposition, and other defects of the resulting polymer, thus producing a product of inferior quality.

In the continuous preparation of a polymer, a stage of the process which just as important as the polymerization reaction is the purification of the polymer through separation of the unreacted monomer, solvent, etc., from the polymerization solution after the polymerization reaction. In the course of manufacturing such a polymer, still another problem that is posed by the high viscosity of the polymer solution is that, for the separation of volatile low-molecular-weight substances from the polymerization solution, the effect of separation between the low-molecular-weight substances generally having low diffusion rates and the highly viscous polymerization solution must be enhanced by giving a broad mass transfer area and a high degree of renewal to the highly viscous polymerization solution at a high temperature under reduced pressure. A method proposed long ago teaches that a polymer solution containing a volatile matter to be separated should be heated and transformed into tapes under reduced pressure. The method provides a large mass transfer area, but the renewal of the interface for mass transfer is so scarce that the evaporation of the volatile matter is limited to the vicinity of the tape surface and, consequently, a high degree of separation effect cannot be achieved. As an alternative, commercial-scale manufacturers use vent-type extruders. It provides a very wide renewable evaporation surface for the volume of retained polymerization solution for only a short treating time for the solution.

Nevertheless, it is still necessary to use multi-screw extruders of the vent type rather than single-screw ones if a very high evaporative separation efficiency is to be achieved. Such equipment supplies the polymerization solution with the shearing force and energy intense enough to reduce the molecular weight of the resulting polymer. In addition, it is well known by chemical producers that the equipment is too costly for commercial operation.

This invention is proposed with the foregoing in view. It is therefore a principal object of the invention to provide a novel process for preparing polymers which causes no nonuniformity of mixing, facilitates the control of the polymerization reaction temperature, and permits continuous operation without any limitation to the scale of polymerization and hence quantity production of quality products.

Another object of the invention is to provide a novel evaporation process whereby the polymers obtained from the abovementioned process can be continuously and economically purified to high grades of quality.

The first object of the invention is realized by carrying out a polymerization reaction in a cylindrical casing having an axis extended horizontally and equipped with a plurality of rotating shafts in parallel, each carrying thereon a plurality of agitation discs in a row, said shafts being rotated at the same speed in the directions opposite to each other, the polymerization reaction being effected under temperature conditions controlled by scattering controlled amounts of a nonsolvent having a boiling point lower than those of the polymerization solution retained in the cylindrical casing, over the free surface of the retained polymerization solution in a plurality of axially divided sections of the casing, allowing the nonsolvent to evaporate, and then taking out the evaporated nonsolvent from the cylindrical casing.

As described above, the present invention relies upon direct heat exchange for the temperature control. To attain this purpose, the free surface of the retained polymerization solution is divided into a plurality of sections distributed axially of a cylindrical casing, and controlled amounts of a nonsolvent are distributed among those sections. By this simple arrangement the control of the polymerization reaction temperature is greatly facilitated and the heat generated by the polymerization reaction, agitation, ec. can be dissipated at a rate in harmony with the temperature distribution of the retained polymerization solution. While the heat dissipation is in progress, a plurality of rotating shafts each carrying agitation discs, rotate in the directions opposite to each other within the cylindrical casing. Thus the rotation of the shafts allows the polymerization reaction to proceed simultaneously with the heat exchange within the casing, with the consequence that the main body of the polymerization solution in the vicinity of the heating surface is quickly and uniformly mixed up without any irregularity of mixing, such as nonuniformity of temperature distribution, thus giving birth to a polymer of very desirable quality. Also, according to this invention, the direct heat exchange as above described limits the evaporative bubbling within the free surface of the reaction zone, and it thereby precludes any decrease in the volume efficiency of the reactor or adhesion of the polymerization solution on the inner wall surface of the reactor, thus permitting continuous operation of the apparatus. Furthermore, because the aforedescribed direct heat exchange is not limited to the heating surface of the cylindrical casing as is the case with the conventional apparatus, the scale of polymerization is not restricted in any way. In brief, the process of the invention is very advantageous in the mass producing of quality polymers rapidly and continuously because the polymerization reaction temperature can be easily controlled without any nonuniformity of mixing, such as in the temperature distribution, the scale of polymerization is not limited, and continuous operation is made possible.

The second object of the invention is realized by a process for preparing polymers from polymerizable organic compounds which comprises introducing the polymer obtained from the aforedescribed process into a horizontally held cylindrical casing wherein a plurality of rotating shafts each carrying a plurality of agitation discs are held in parallel and rotated at the same speed in opposite direction. The solution is heated while preferably maintaining a reduced pressure in the cylindrical casing, thereby evaporating volatile matter from the surface of the polymerization solution. By this process as much unreacted monomer, solvent, etc., as possible can be separated out from the highly viscous polymer leaving the polymerization process, the separation being accomplished at relatively low cost. The polymer emerging from the preceding polymerization process is led into a cylindrical casing in which a plurality of rotating shafts each carrying a plurality of agitation discs are arranged in parallel and driven at the same speed in the opposite directions. This enables the highly viscous polymerization solution containing volatile matter to have a large free surface which is constantly and vigorously renewed. At the same time, the polymerization solution is heated, preferably under reduced pressure, whereby the separation effect of the volatile content is remarkably enhanced, continuous purification is made possible, and a polymerization solution of high purity is obtained. Since the highly viscous polymerization solution is simply agitated by the agitation discs without the powerful shearing force and energy as by the conventional apparatus, the resulting polymer does not suffer from any drop of its molecular weight. Moreover, because the polymerization solution transferred for purification from the polymerization process is simply agitated and heated with or without reduction of pressure, the manufacturing means are accordingly simplified and made economical. The polymer delivered from the polymerization process is thus continuously and economically purified to a high-grade product.

The improved process for polymerization and evaporation in accordance with the present invention will be more fully explained in conjunction with the accompanying drawings showing preferred embodiments thereof. In the drawings.

The process of the invention will be hereinafter described as applied to continuous bulk polymerization (thermal polymerization) of styrene.

Figure 1:
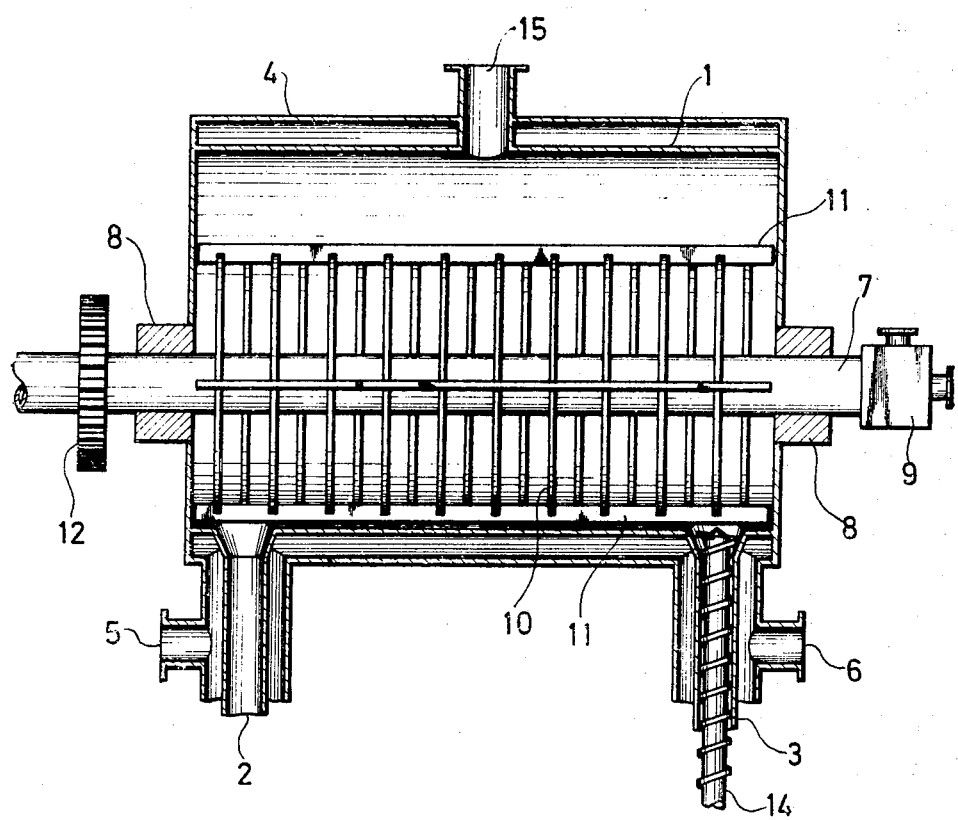
FIG. 1 is a vertically sectional side view of an embodiment of apparatus adapted for practicing the process of the invention for preparing a polymer.
Figure 2:
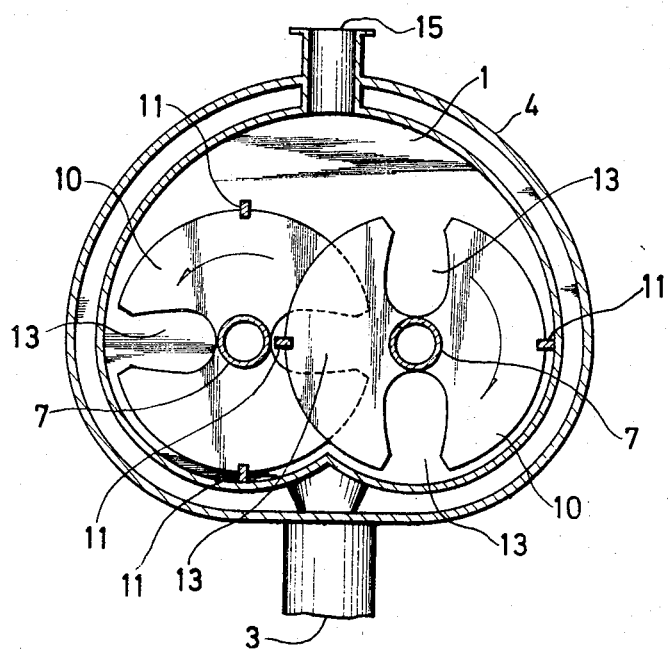
FIG. 2 is a vertically sectional front view of the apparatus.
Figure 3:
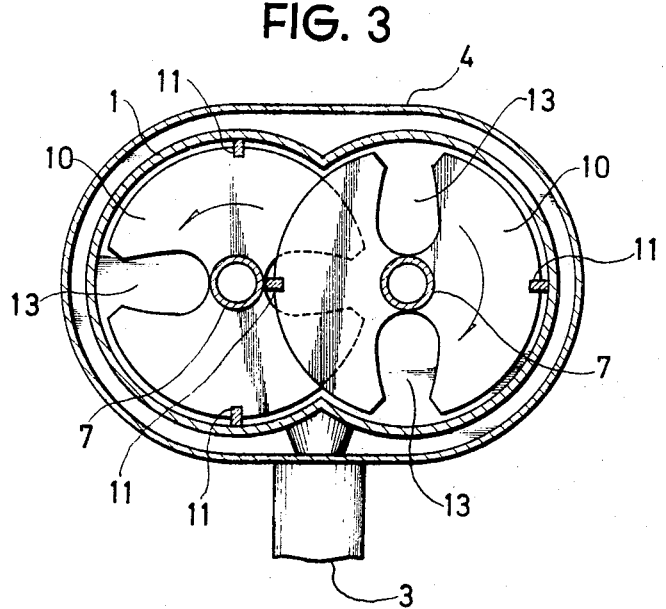
FIG. 3 is a vertically sectional front view of another embodiment.

Referring specifically to FIGS. 1, 2 and 3, there is shown a cylindrical casing 1 of an apparatus, provided with an inlet 2 at one axial end for the introduction of a solution to be treated and an outlet 3 for the treated solution at the other end. The cylindical casing 1 is wrapped with a jacket 4 which in turn has an inlet 5 and an outlet 6 for a cooling or heating medium. The numeral 7 indicates a rotating shaft, which is hollow and extends axially through the cylindrical casing to be supported at the both ends with bearings 8. In the embodiments shown, two rotating shafts 7 are disposed in parallel. With a rotary joint 9 mounted on one end of each shaft 7, a cooling or heating medium is circulated through the hollow of the shaft. The numeral 10 designates a disc, which is not limited to an ordinary solid disc but may take any other suitable form as, for example, perforated, wire-netted, slitted, or wheel-shaped disc. A plurality of such discs 10 are mounted in a row in a regularly spaced relationship on each rotating shaft 7. The diameter of the discs 10 is preferably larger than the distance between the axial centers of the two rotating shafts. As shown, the plurality of discs mounted on each rotating shaft 1 are arranged alternately, or in a staggered fashion, with the discs on the other shaft. To the peripheries of the discs are secured agitation bars 11 in the direction parallel to the shafts. The rotation of the shafts causes the agitation bars 11 to agitate the solution being treated. In addition, because the bars extend either lightly in contact with the inner surface of the cylindrical casing 1 or just clear the surface, they serve to scrape off the solution from the vicinity of the inner surface of the casing. The two shafts 7 are coupled with timing gears 12 so as to rotate at the same speed in the directions opposite to each other. Therefore, the discs must be formed with cutouts or recesses 13 lest the agitation bars 11 on the peripheries of the discs on each shaft should collide with the discs on the other shaft. Desirably those recesses are trochoidally shaped but not limited thereto. Any other shape may be adopted only if the recesses prevent the discs from hitting the agitation bars 11 during operation.

Figure 4:
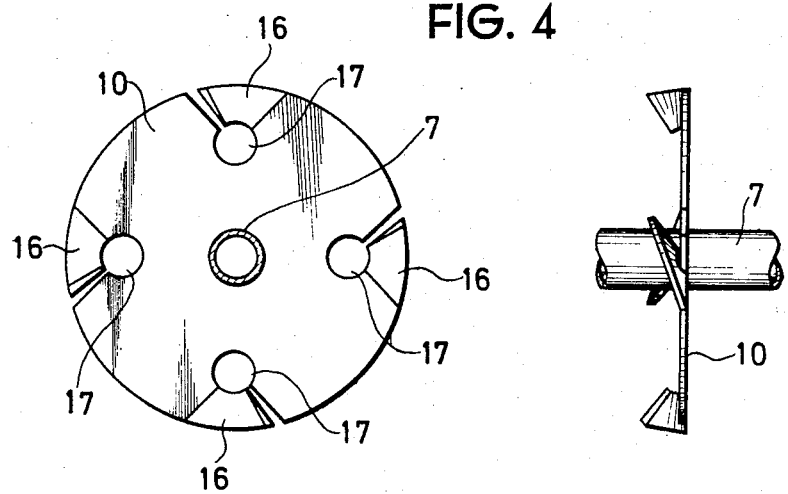
FIG. 4 is a front view and a side view of an agitation disc according to the invention other than those shown in FIGS. 1 to 3.

In the apparatus above described, a solution to be treated is introduced through the inlet 2, treated, and discharged through the outlet 3. The discharge is effected, for example, by a screw pump 14. The heat exchange with the solution retained among and in the neighborhood of the disc-shaped rotors 10 is accomplished by a cooling or heating medium which is led into the hollows of the shafts through the rotary joints 9 at the shaft ends and also into the jacket 4. FIG. 2 illustrates the operation of an apparatus of so-called half-filled type in which the free surface of the solution being treated is exposed in the longitudinal direction of the cylindrical casing, whereas FIG. 3 shows the operation of a filled-up type. For the operation of the free-surface-renewal type, an outlet (or inlet) 15 is provided for the vapors that are removed from the solution being treated (or for the substances that are introduced into the solution). FIG. 4 shows another form of disc 10 embodying the invention. The disc is slitted and its peripheral portions are bent away from one edge of the slits to form fins 16 on one side of the disc. In the proximity of the point where each bend line and slit line intersect is formed a hole 17 to avoid retention of the solution in the constricted portion of the disc. The fins 16 are formed for the following purposes. For one thing, they subject the solution to cuts in addition to the simple shearing motion among the discs so as to improve the mixing characteristic of the solution remarkably. For the other, the fins allow the solution to be fed in suitable amounts longitudinally of the apparatus as indicated by broken lines and arrows in FIG. 5. This construction is extremely beneficial in an apparatus of half-filled type wherein the solution cannot be caused to flow by the pressure difference as in the filled-up type. Also, the construction when combined with a heat-dissipation method such as the evaporative cooling of a polymerization reactor makes it unnecessary to remove heat from the jacket, and hence permits omission of the agitation bars 3. In this way the agitation power can be saved. The apparatus adapted for practicing the present invention has so far been described in conjunction with FIGS. 1 to 5. Now the process for continuously preparing a polymer in accordance with the invention will be described in conjunction with FIG. 6.

The process of the invention for preparing polymers, essentially by bulk polymerization consists of three major stages, i.e., preliminary polymerization whereby from 5 to 50 percent of a starting monomer or monomers are converted into a polymer, polymerization whereby the rest of the starting material is polymerized, and evaporation whereby the unreacted monomer or monomers are separated and removed from the reaction product. In this respect the process of the invention is not basically different from known processes. In the stage of preliminary polymerization (which is not directly related to this invention), a tank type prepolymerization reactor 200 which is equipped with ordinary agitation blades 202, such as turbine-, paddle-, ribbon-, or oar-shaped blades, is used. The reactor 200 is continuously supplied with monomeric styrene as starting material from a monomer tank 100 through a line 201. Where rubber-modified polystyrene is to be obtained, the starting material may of course be a solution of a rubber-like polymer, such as styrene-butadiene copolymer, polybutadiene, or polyisoprene, in styrene. The stage of preliminary polymerization is usually operated on a small scale and the conversion into the polymer is too small to cause any difficulty ascribable to an increased viscosity of the polymerization solution. The control of the polymerization temperature is in many cases properly accomplished by the indirect heat exchange through the jacket. This is not the case with a large-scale polymerization operation, in which case the indirect heat removal by the jacket 203 is combined with exterior circulatory heat removal, as in the embodiment under consideration. For the cooling of the exterior-circulatory polymerization solution evaporative cooling is adopted. To be more specific, a part of the polymerization solution is taken out of the prepolymerizer 200 through lines 204, 205, and is supplied to the apparatus shown in FIGS. 1 and 2 or a so-called surface-renewal apparatus 206 of half-filled type having a gas-phase zone similar to the apparatus of FIGS. 1 and 2. The evaporative cooling method is applied to the cooling of the circulatory polymerization solution. The gas-phase zones of a condenser 210 and the evaporative cooler 206 are interconnected by a line 208. The gas-phase zones are kept under reduced pressure by suction of air from a line 212 associated with the condenser 210 or by control of cooling water 211. From the renewable free surface of the polymerization solution exposed in the longitudinal direction of the cooler 206, the monomer is evaporated and/or a low-boiling-point solvent or nonsolvent (preferably water) is evaporated from the polymerization solution. The vapor is condensed for heat exchange by the condenser and recycled to the cooler 206 via a line 209. In this manner the circulatory polymerization solution is efficiently cooled by the evaporative cooling and cycled to the prepolymerizer 200 through a line 207. From the viewpoint of ordinary evaporative cooling, the polymerization with the exterior circulatory cooling as above described is tantamount to an improved process wherein the evaporative cooling zone is separated from the polymerization region. Thus a polymerization process with highly efficient exterior circulatory heat removal by direct evaporative cooling is provided which makes it possible to operate the polymerization reactor 200 of filled-up type and avoid any drop of the volume efficiency due to bubbling of the polymerization solution or adhesion of the solution to the inner wall of the apparatus. If a part or whole of the monomer fed through the line 201 is introduced into the evaporative cooler 206 and thence, together with the exterior circulatory polymerization solution, into the prepolymerizer 200, the solution inside the evaporative cooler 206 is diluted with the monomer and therefore the prepolymerizer can handle a solution of low viscosity. This is highly beneficial for inhibiting the bubbling of the solution. To adopt the present process for the stage of preliminary polymerization may not be quite advisable where the polymerization is carried out on a limited scale but will prove very helpful for larger-scale operations. The polymerization solution which leaves the preliminary polymerization stage through lines 204, 301 is such that usually from 5 to 50 percent of the monomer initially fed has been converted into the polymer in the solution. The conversion is governed by the preliminary polymerization temperature and retention time which are preset in view of the quality of the polymer desired as the final product, and therefore is not limited within the range above specified. The preliminarily polymerized solution is charged through the line 301 into a polymerization reactor 300 wherein the polymerization reaction according to the present invention is carried out.

Figure 5:
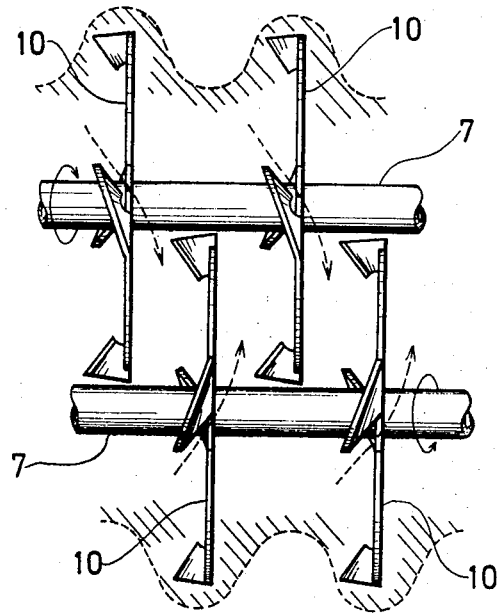
FIG. 5 is an explanatory view illustrating an arrangement of agitation discs and retention of a polymerization solution.

The polymerization reactor 300 is a surface-renewal apparatus of half-filled type as shown in FIGS. 1, 2 and 4. The polymerization solution fed from the line 301 to the reactor 300 is held and retained with stirring among and in the vicinity of a number of rotating disc-shaped rotors 10, and its free surface is exposed longitudinally of the cylindrical casing 1. The solution is urged toward the outlet 3 while its free surface is being rapidly renewed by the interaction of the disc-shaped rotors 10 which are mounted on two shafts 7 to overlay each other and run in the opposite directions. As generally illustrated in FIG. 5, the polymerization solution is retained in an extremely stabilized way and is urged at a suitable rate toward the directions of the broken lines and arrows by the action of the fins 16 shown in FIG. 4. A substance having a low boiling point is introduced into the reactor 300 via lines 307, 308 and is atomized and sprayed by nozzles 310, 309 over the free surface of the polymerization solution. Thereupon the low-boling-point substance is evaporated and the heat of polymerization reaction and agitation that is produced in a large quantity with the progress of the polymerization reaction is instantly carried away from the polymerization solution region. The vapors of the evaporated low-boiling-point matter and the monomer which is also evaporated and entrained are led through a line 302 into a condenser 303, wherein they are condensed, subjected to heat exchange, and collected in a storage tank 305 for recycling. The low-boiling-point substance to be sprayed is, in the case of bulk polymerization of styrene, water, methyl alcohol or other nonsolvent. Whatever else having a lower boiling point than the polymerization solution, monomer, and solvent may be used regardless of its type, and therefore a suitable nonsolvent can be used in consideration of the polymerization temperature to be encountered. Water is preferably employed because of its great latent heat of evaporation and its adequate boiling point. Although in the embodiment shown in FIG. 6 the spraying area is divided into two zones 310, 309, there is no limitation at all to the division or non-division of the spraying area. It is a matter of choice simply dependent upon the conditions for setting the polymerization temperature, for example, the distribution of polymerization degree desired. If necessary, the low-boiling-point substance may be taken out, for example, from a line 306 and replenished from a line 311. The evaporation of the low-boiling-point substance thus sprayed is accompanied by the evaporation of the monomeric styrene. If the low-boiling-point substance chosen is water, the vapors will be collected as two separate phases in the storage tank 305. Therefore, if the condensates are recycled by spraying close to the inlet of the reactor 300, the pulsating flow characteristic of the polymerization solution will be maintained and the polymerization reaction will be concluded with a high degree of volume efficiency. Alternatively, the monomer phase may be returned to the prepolymerizer 200. The operation above described may be modified by adjusting the gas-phase pressure of the polymerization reactor 300 via a line 312, so that the evaporation temperature, composition, etc. of the low-boiling-point substance are changed and the ranges of the polymerization conditions are expanded. The polymerization solution in the reactor 300 flows as a typically pulsating flow by the partitioning action of the multi-shaft, multi-disc agitation mechanism, and, with a uniform retention time distribution, it is sent in suitable amounts toward the discharge port. In the longitudinal zones the polymerization reaction proceeds under controlled temperature conditions, and then is discharged into a line 401 by means of a vertical screw pump or the like.

The polymerization solution discharged from the polymerization reactor 300 contains a polymer usually with a conversion of about 70 to 98 percent of the theoretically convertable amount of the monomer. From the standpoint of the fluidity of the solution, therefore, it is desirable to maintain the final polymerization reaction zone of the reactor 300 at a temperature in excess of 160° C. After all, the temperature is governed by the fluidity of the solution, and a temperature below 160° C. may be used where the polymer content warrants.

After the polymerization reaction, the solution contains low-molecular-weight matter composed largely of the unreacted monomer, in addition to the polymer. The volatile low-molecular-weight substances are introduced into a volatilizer 400, where they are volatilized and removed. The volatilizer 400 is an apparatus of the surface renewal type which permits the half-filled type operation substantially like the embodiment shown in FIGS. 1, 2 and 4. The polymerization solution which contains the volatile low-molecular-weight matter is supplied to this vessel via the line 401, and it exhibits the same retention, renewal, and transfer behaviors as in the polymerization reactor 300. The cylindrical body is equipped with a jacket 4 and rotating shafts 7 which circulate a heating medium and thereby positively heat the polymerization solution. The vapors of the volatile substances evaporated from the renewable free surface are taken out through a line 402 and recovered by a condenser 403. Usually the gas-phase portion of the volatilizer 400 is kept under reduced pressure through a line 408 connected to a storage tank 406. The rate of indirect heat exchange between the heating medium in the jacket 4 and the polymerization solution in the cylinder 1 is remarkably improved by the scraping action of agitation bars 11 attached to disc-shaped rotors 10 with a meager clearance from, or just clear of, the inner wall surface of the cylinder to replace the portion of the solution close to the heating surface by a fresh portion of the solution. Likewise, the rate of heat exchange between the heating medium circulated through rotating shafts 7 and the polymerization solution is considerably enhanced because the entire surface of the plurality of disc-shaped rotors 10 achieves a high fin efficiency with an accordingly expanded heating surface. The power that is otherwise consumed for the agitation of the polymerization solution is converted into heat and is utilized as such. In the manner described the polymerization solution in the volatilizer 400 is effectively heated, and an extremely uniform mixing is attained in the radial direction of the vessel. Moreover, the free surface exposed in the longitudinal direction is renewed, and the low-boiling-point matter is efficiently evaporated and removed. As is known in the art, a polymerization solution supplied under reduced pressure often produces bubbles of the volatile matter such as the monomer therein contained, and usually the bubbles in the highly viscous solution are difficult to remove. According to the present invention, by contrast, no special defoaming mechanism is required because the defoaming is accomplished as the renewable free surface is repeatedly cut and broken by the action of the two rows of disc-shaped rotors 10 running in opposite directions. The solution is thus effectively heated while being pulsatingly transferred toward the exit. The polymerization solution (or the polymer in a molten state) which has been freed of the volatile matter by evaporation is discharged by means of a screw pump or the like. The fact that the purified polymer in the molten state contains the least possible volatile matter is desirable for the physical properties of the polymer and also from the viewpoint of human health in certain applications of the product. In accordance with the present invention, it is possible to limit the volatile content to less than 0.01 percent provided that adequate operating conditions are chosen. The purified polymer 501 that is discharged in the molten state from the volatilizer 400 is, if necessary, extruded in the form of tape under increased pressure, cooled in a cooling bath 500, and chipped by a chip cutter 600 into chips 700 of the polymer.

EXAMPLE

Figure 6:
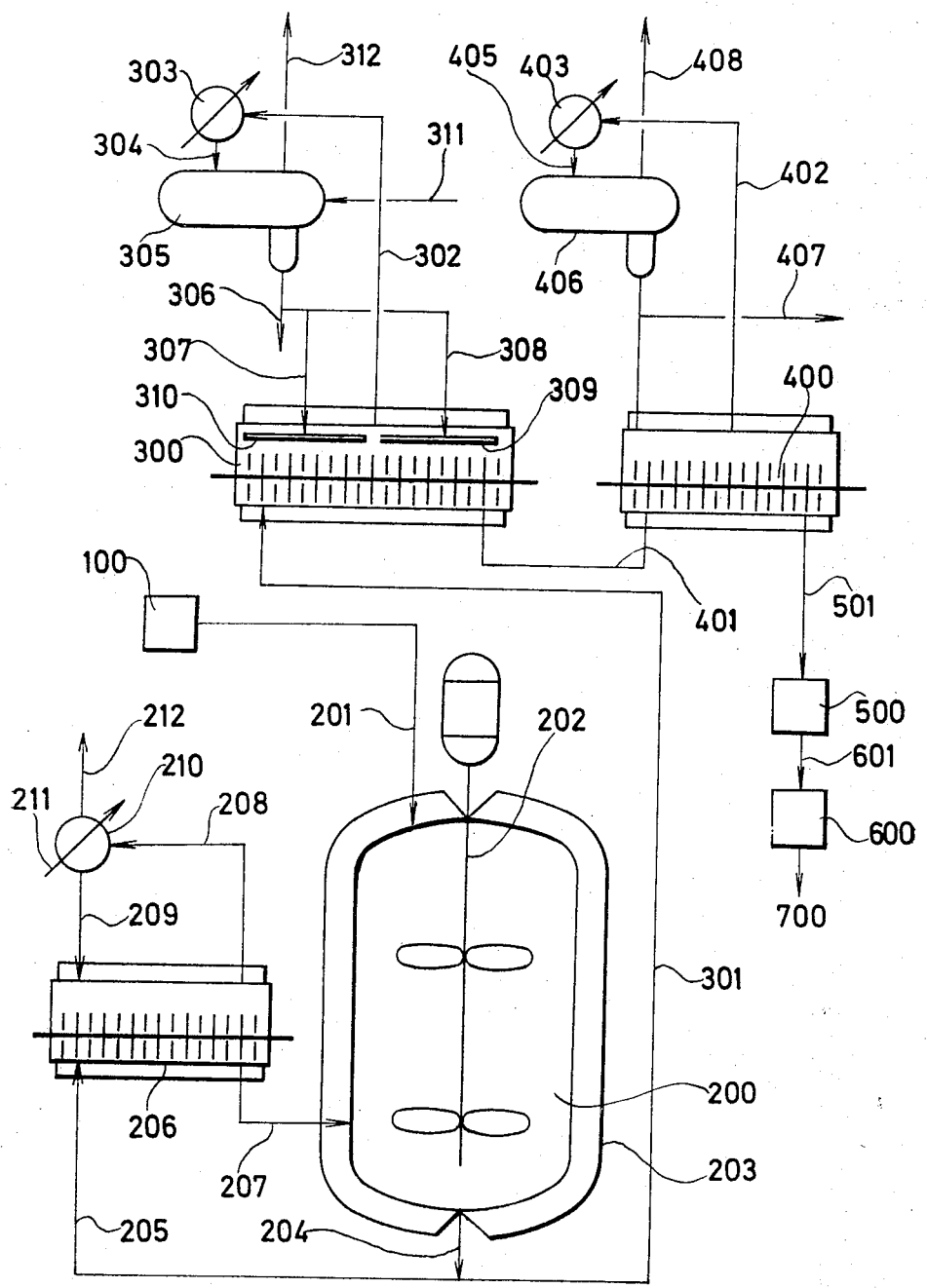
FIG. 6 is a flow chart showing an embodiment of the polymer manufacturing process of the invention.

Continuous bulk polymerization (thermal polymerization) of styrene was carried out in a system as shown in FIG. 6. By an operation of the prepolymerizer 200 equipped with a stirrer with an adequate retention time and at a reaction temperature ranging from 80° to 150° C., 15 to 50 percent of the styrene monomer was converted into a polymer. The polymerization reactor 200 had discs 10 as shown in FIGS. 1 and 2 which measured 200 mm. in diameter, and were arranged at intervals of 50 mm. (on each shaft). The disc-shaped rotors 10 had the same contours as those of FIG. 4 which were free of agitation bars 11. They were driven at a speed between 8 and 40 r.p.m. To dissipate the heat of reaction and agitation, water freed of dissolved air was used as the low-boiling-matter substance. The spraying zone in the reactor was divided into two, each to be sprayed independently of the other. The temperature of the polymerization solution inside was measured at points spaced with an interval of 300 mm. in the longitudinal direction of the vessel, and the low-boiling-point matter was continuously or intermittently supplied and sprayed by automatic means in order that desired temperatures can be maintained. In this example, the temperature of the spraying zone near the inlet was kept within the range of 120° to 160° C. and that of the zone near the outlet was kept within the range of 140° to 190° C. with a local control allowance of ±3° C. (excluding the transition areas at the both ends of the spraying zones). The operation pressure required for the gas-phase portion of the reactor 200 was, for example when the polymerization temperature was set at 160° C., less than 2 kg./cm.² G throughout the process. This is a condition which does not permit the existence of water as a separate liquid phase in the reaction zone when the styrene vapor pressure of the polymerization solution and the vapor pressure of water are taken into account. It means that the water sprayed is evaporated almost instantaneously. The experimental feed rate of the polymerization solution to the reactor 200 ranged from 8 to 45 kg./h. The polymerization solution discharged by the vertical extruder type screw pump had been converted into a solution which contained 65 to 96 percent polymer. The solution was immediately and continuously fed to the volatilizer 400 equipped with discs 150 mm. in diameter disposed at intervals of 50 mm. The vessel was like the one shown in FIGS. 1 and 2, and each disc had two slits and fins 16 as shown in FIG. 4. The operation pressure for the gas-phase region was set between 3 and 70 torr. The disc speed was set between 8 and 64 r.p.m. At the outlet of the vessel the purified polymer in the molten state was at a temperature between 190° and 255° C., and the volatile content of the polymer had been reduced to 1.0 to 0.01 percent. The polymer in the molten state was continuously discharged in the form of a strand by the screw pump which also served as an extruder. The strand was cooled by the cooling bath and then chipped. This polymer product was superior to those conventionally prepared in various properties, such as the residual monomer percentage, tension strength, modulus of elasticity, softening point, and light transmissivity.

The operating conditions employed and the polymer obtained by way of an example were as tabled below.

|  | Preliminary polymerization | Polymerization | Volatilization |
|---|---|---|---|
| Average retention time [a] (hr.) | 2.0 | 3.0 | 0.5 |
| Operating temperature (° C.) | 136.4 | 140.3 | 219.0 |
| Operating pressure, (kg./cm.² G) |  | 1.46 | [c] 4.3 |
| Reaction rate (wt. percent) | 44.0 | 92.7 |  |
| Residual monomer (wt. percent) |  |  | 0.069 |
| Intrinsic viscosity [b] (η) |  | 0.932 | 0.930 | 0.915 |

[a] Flow rate for continuous monomer supply = 20.0 l./H.
[b] Measured in solvent toluene at 30° C.
[c] Torr.

While the present invention has been described hereinbefore in connection with specific embodiments and example, it should of course be understood that the invention is not restricted thereto but numerous modifications and alterations in designs are possible without departing from the spirit of the invention.

What is claimed is:

1. A process for preparing polymers from styrene which comprises carrying out a polymerization reaction in a cylindrical casing equipped with a plurality of rotating shafts in parallel, each carrying thereon a plurality of agitation discs in a row, said shafts being rotated at the same speed in the directions opposite to each other, characterized in that the polymerization reaction is effected under temperature conditions controlled by spraying water over the free surface of the retained polymerization solution in a plurality of axially divided sections of the casing, the amount of water being such that it evaporates on contact with polymerization solution and does not exist as a separate liquid phase in the reaction zone, allowing the water to evaporate, and removing the evaporated water from the cylindrical casing.

2. A process for preparing polymers from polymerizable organic compounds as defined in claim 1 characterized in that the polymer is introduced into a cylindrical casing wherein a plurality of rotating shafts, each carrying a plurality of agitation discs thereon, are arranged in parallel and driven at the same speed but in opposite directions, and the solution is heated while the cylindrical casing is kept under reduced pressure, so that volatile matter is volatilized from the surface of the polymerization solution.

References Cited
UNITED STATES PATENTS

| 3,439,065 | 4/1969 | Luftglass | 260—93.5 S |
| 3,522,214 | 7/1970 | Crawford | 260—95 R |

JAMES A. SEIDLECK, Primary Examiner

U.S. Cl. X.R.
260—95 R, 880 R